(12) United States Patent
Diard et al.

(10) Patent No.: US 7,965,898 B2
(45) Date of Patent: Jun. 21, 2011

(54) ACCELERATING VIDEO DECODING USING MULTIPLE PROCESSORS

(75) Inventors: Franck R. Diard, Mountain View, CA (US); Hassane S. Azar, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1634 days.

(21) Appl. No.: 11/260,940

(22) Filed: Oct. 28, 2005

(65) Prior Publication Data

US 2007/0098080 A1  May 3, 2007

(51) Int. Cl.
*G06K 9/36* (2006.01)
(52) U.S. Cl. .................... 382/239; 375/240.16
(58) Field of Classification Search .......... 345/545, 345/546; 348/14.13, 14.15; 375/E7.027, 375/E7.096, E7.103, 240, 240.01–240.29; 382/239
See application file for complete search history.

(56) References Cited

U.S. PATENT DOCUMENTS

| | | | |
|---|---|---|---|
| 5,699,128 A | 12/1997 | Hayashi | |
| 6,185,340 B1 * | 2/2001 | Comer | 382/236 |
| 6,275,536 B1 | 8/2001 | Chen et al. | |
| 6,871,001 B1 * | 3/2005 | Okada | 386/6 |
| 6,996,178 B1 * | 2/2006 | Zhang et al. | 375/240.16 |
| 2005/0063466 A1 * | 3/2005 | Etoh et al. | 375/240.16 |
| 2005/0152454 A1 * | 7/2005 | Wang et al. | 375/240.16 |
| 2005/0198644 A1 * | 9/2005 | Jiang et al. | 718/107 |
| 2005/0262311 A1 * | 11/2005 | Lippincott | 711/147 |

OTHER PUBLICATIONS

International Search Report, PCT/US06/60359, filed Oct. 30, 2006.

* cited by examiner

*Primary Examiner* — Gregory F Cunningham
(74) *Attorney, Agent, or Firm* — Patterson & Sheridan, LLP

(57) ABSTRACT

A system and method for decoding high definition video content using multiple processors reduces the likelihood of dropping video frames. Each of the multiple processors produces and stores a portion of a decoded video frame in its dedicated frame buffer. A region of a reference frame that is needed to produce a first portion of a decoded video frame, but that is not stored in the frame buffer coupled to the processor that will decode the first portion, is copied to the frame buffer. The size of the region needed may vary based on a maximum possible motion vector offset. The size of the region that is copied may be dynamic and based on a maximum motion vector offset for each particular reference frame.

20 Claims, 10 Drawing Sheets

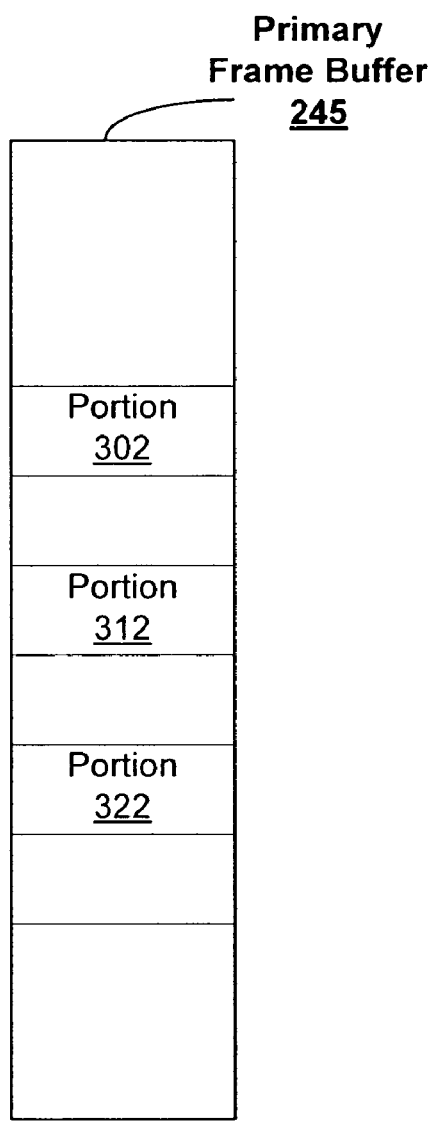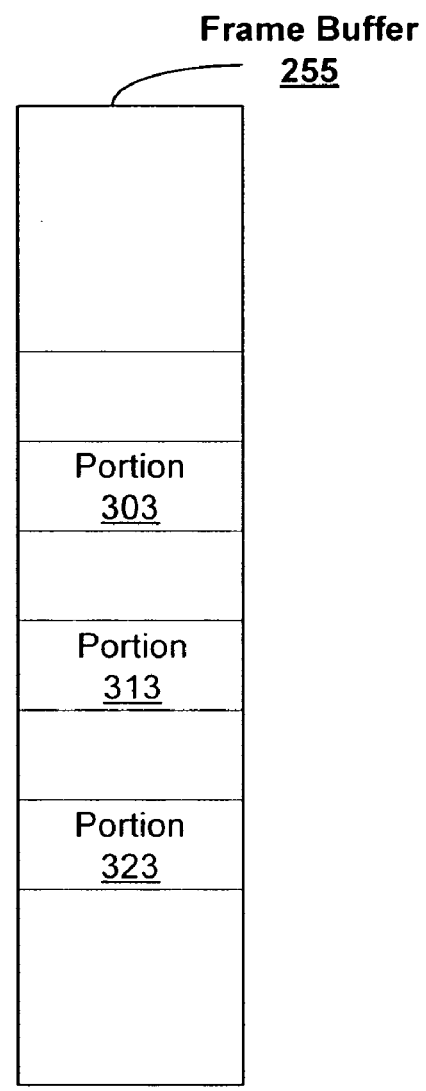
Figure 3D                    Figure 3E

ACCELERATING VIDEO DECODING USING MULTIPLE PROCESSORS

BACKGROUND OF THE INVENTION

1. Field of the Invention

Embodiments of the present invention generally relate to video decoding, and more particularly to decoding video data using multiple processors.

2. Description of the Related Art

Conventional MPEG compressed video frames may be decoded by a single processor without dropping frames. With the advent of new compression techniques such as MPEG-AVC or VC-1, high definition content may be compressed using a higher compression ratio, permitting storage of a full length movie in high definition quality on a DVD. The higher compression ratio increases the likelihood that frames will be dropped because all of the frames cannot be decoded quickly enough by a single processor.

Accordingly, it is desirable to reduce the likelihood that frames will be dropped by increasing the video decoding performance of the system.

SUMMARY OF THE INVENTION

The current invention involves new systems and methods for decoding high definition video content using multiple processors and reduces the likelihood of dropping video frames. Each of the multiple processors produces a portion of a decoded video frame. A region of a reference frame that is needed to produce a first portion of a decoded video frame, but is not stored in the frame buffer coupled to the processor that will decode the first portion, is copied to the frame buffer. The size of the region needed may vary based on a maximum possible motion vector offset. The size of the region that is copied may be dynamic and based on a maximum motion vector offset for each particular reference frame used to produce a portion of a dependent frame.

Various embodiments of a method of the invention for decoding compressed video frames using multiple processing devices include receiving a bitstream including data for the compressed video frames, identifying a first portion of the data in the bitstream for decoding by only a first processing device to produce a first portion of a reference frame, identifying a second portion of the data in the bitstream for decoding by only a second processing device to produce a second portion of the reference frame, and determining if a region of the second portion of the reference frame is needed by the first processing device to produce a first portion of a dependent frame.

Various embodiments of the invention include a computer-readable medium containing a program which, when executed by a programmable graphics processor, performs a process for decoding compressed video frames using multiple processing devices. The process includes receiving a bitstream including data for the compressed video frames, identifying a first portion of the data in the bitstream for decoding by only a first processing device to produce a first portion of a reference frame, identifying a second portion of the data in the bitstream for decoding by only a second processing device to produce a second portion of the reference frame, and determining if a region of the second portion of the reference frame is needed by the first processing device to produce a first portion of a dependent frame.

Various embodiments of the invention for decoding compressed video represented by a bitstream including motion vectors include a first processing device and a second processing device. The first processing device is coupled to a first frame buffer and is configured to decode a first portion of the bitstream to produce a first portion of a dependent video frame, the first frame buffer configured to store the first portion of the dependent video frame and a first portion of a reference video frame. The second processing device is coupled to a second frame buffer and is configured to decode a second portion of the bitstream to produce a second portion of a dependent video frame, the second frame buffer configured to store the second portion of the dependent video frame and a second portion of the reference video frame.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 3D and 3E are conceptual diagrams of portions of decoded video frames stored in multiple frame buffers in accordance with one or more aspects of the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

A system and method that reduces the likelihood of dropping video frames decodes high definition video content using multiple processors. Each of the multiple processors produces a different portion of a decoded video frame and stores the portion in a local memory (frame buffer). Dividing the workload of decoding the frames between multiple processors improves the decoding performance and reduces the likelihood that frames will be dropped. However, dividing the decoding of each frame and storing the frame in portions in the frame buffer associated with each of the multiple processors introduces challenges for decoding dependent frames.

In particular, a macroblock of a reference frame, i.e., reference macroblock, that is needed to decode a macroblock of a dependent frame, i.e., dependent macroblock, may have been decoded by a different processor than the processor decoding the dependent frame. Therefore, the reference macroblock should be copied to the frame buffer associated with the processor decoding the dependent macroblock. In one embodiment of the present invention, each processor decodes a unique portion of every frame and the other portions of each reference frame are copied from one or more of the frame buffers, so that each frame buffer stores each entire decoded reference frame. This embodiment is a robust solution, however, copying all of the missing portions of the reference frames reduces overall system performance when frame buffer memory bandwidth is limited. In other embodiments of the present invention less data is copied between the frame buffers, minimizing the memory bandwidth used to copy frame data while maintaining the performance advantages of distributing the decoding workload between multiple processors.

Figure 1A:
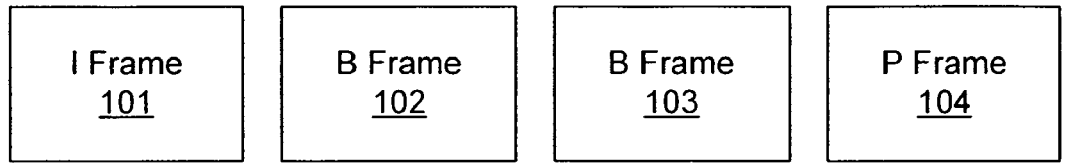
FIG. 1A is a sequence of prior art decoded MPEG video frames.

FIG. 1A is a sequence of prior art decoded MPEG video frames. A bitstream is decoded to produce a sequence of video frames. The bitstream includes reference frames and difference data representing motion (interframe coding) that is used to decode additional frames to produce a decoded sequence. The decoded sequence includes I (intra coded) frames, such as I frame 101, P (predictive coded) frames, such as P frame 104, and B (bi-directional coded) frames, such as B frame 102 and 103. I frames are decoded without referencing any other frames. P frames are encoded as the difference between an earlier I frame or decoded P frame and a motion compensated prediction frame. Therefore, the P frames are dependent frames for decoding and once they are decoded they may be used as reference frames to produce other P frames. The I frames and the P frames are reference frames that are used to decode B frames.

Figure 1B:
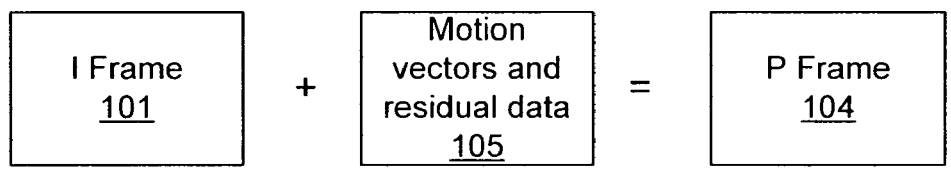
FIGS. 1B and 1C illustrate the generation of prior art decoded MPEG video frames.
Figure 1C:
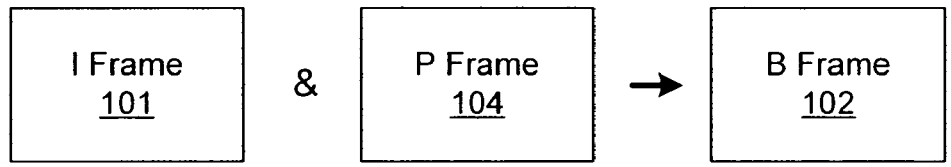

FIG. 1B illustrates the generation of prior art decoded MPEG P frames. The bitstream includes uncompressed video data for each I frame, such as I frame 101. One or more P frames may be decoded using an I frame and motion vectors and residual data 105 that is also included in the bitstream. Additional P frames may also be decoded from a decoded P frame. FIG. 1B illustrates the generation of prior art decoded MPEG B frames. One or more B frames, such as B frame 102, may be decoded using I frame 101 and a P frame 104. B frames may also be decoded using two P frames.

Because data is needed from an I frame to produce a P frame or a B frame, dividing the decoding between multiple processors in a simple manner, such as decoding alternating frames may not improve decoding performance. For example, if I frame 101 and B frame 103 shown in FIG. 1A are decoded by a first processor and B frame 102 and P frame 104 are decoded by a second processor, the decoded P frame 104 is used by the first processor and the second processor. When a shared memory is used to store P frame 104, both processors compete to access the shared memory, possibly decreasing the decoding performance. When dedicated memory is used, i.e. a frame buffer coupled to each processor, each processor needs to access the other processor's dedicated memory in order to produce B frame 102 and B frame 103. In order to improve decoding performance, the present invention divides the decoding of each frame between multiple processors and configures each processor to copy reference macroblocks needed by another processor to produce dependent macroblocks. Performance is improved when compared with having multiple processors access a shared memory to read needed reference macroblocks.

Figure 2:
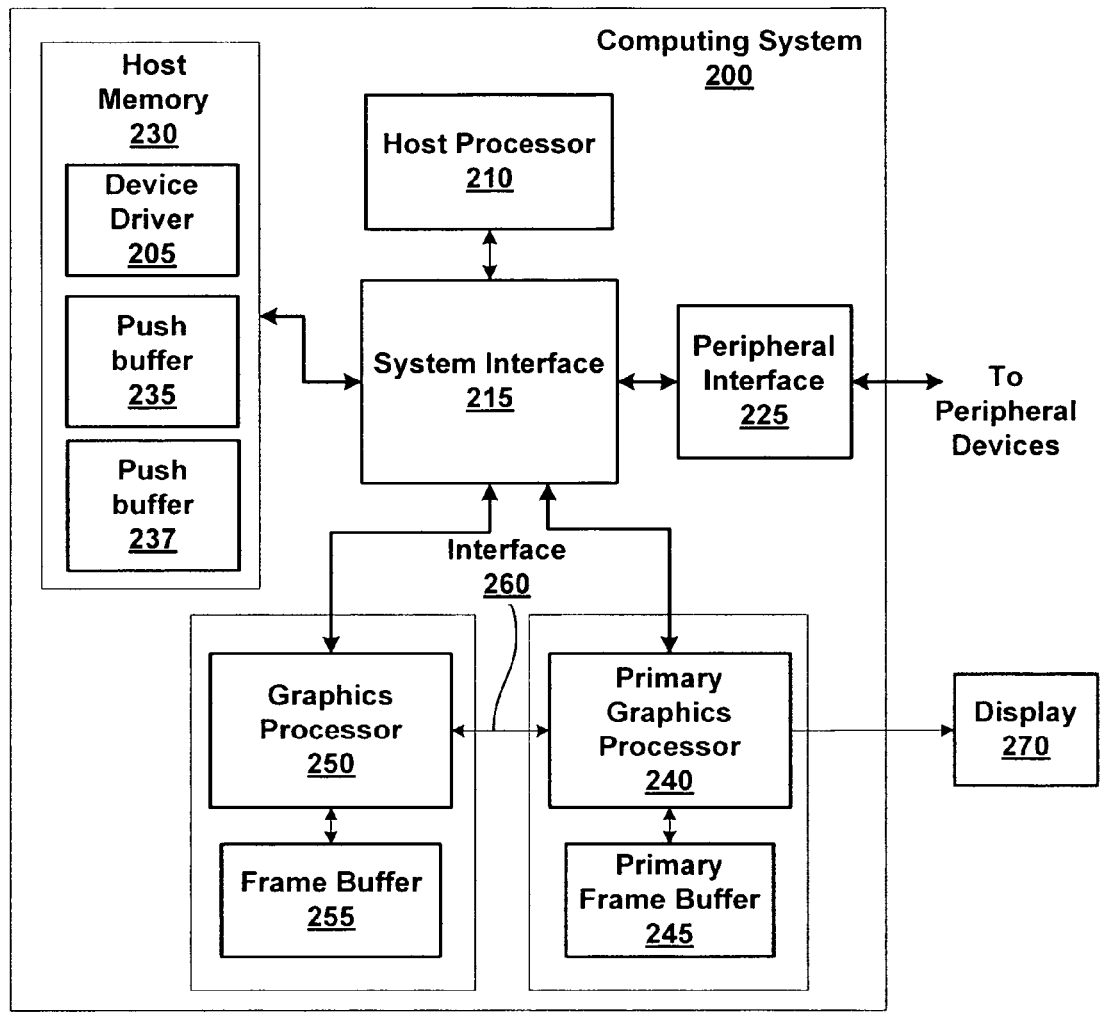
FIG. 2 is a block diagram of an exemplary embodiment of a computing system including multiple processors for video decoding in accordance with one or more aspects of the present invention.

FIG. 2 is a block diagram of an exemplary embodiment of a computing system 200 including multiple processors, primary graphics processor 240 and graphics processor 250, for video decoding in accordance with one or more aspects of the present invention. Computing system 200 may be a desktop computer, server, laptop computer, palm-sized computer, tablet computer, game console, cellular telephone, hand-held device, computer based simulator, or the like. Computing system 200 includes a host processor 210, a host memory 230, and a system interface 215 that is directly coupled to a multiple processors, specifically primary graphics processor 240 and graphics processor 250. In some embodiments of computing system 200, system interface 215 may include several interfaces such as, Advanced Technology Attachment (ATA) bus, Universal Serial Bus (USB), Peripheral component interface (PCI), or the like. System interface 215 provides an interface between host processor 210 and each of primary graphics processor 240 and graphics processor 250. Decoded reference macroblocks are copied from frame buffer 255 to primary frame buffer 245 and from primary frame buffer 245 to frame buffer 255 via system interface 215. Computing system 200 may be coupled to a display 270 and peripheral devices such as a DVD source, printer, disk drive, or the like. Computing system may also include additional processors, such as additional graphics processors and frame buffers, for decoding video frames.

Primary graphics processor 240 and graphics processor 250 are coupled to each other via an interface 260 in order to exchange synchronization information and output decoded frame data to primary graphics processor 240 for output to display 270. Display 270 may include one or more display devices, such as a cathode ray tube (CRT), flat panel display, or the like. In other embodiments of the present invention image data may be output by graphics processor 250 and primary graphics processor 240 and output to a peripheral device or stored in host memory 230. Primary graphics processor 245 is also coupled to a primary frame buffer 245, which may be used to store graphics data, image data, and program instructions. A graphics processor 250 is coupled to a frame buffer 255, which may also be used to store graphics data, image data, and program instructions. In other embodiments of the present invention, interface 260 is used to copy macroblocks of reference frames between frame buffer 255 and primary frame buffer 245.

A device driver 205 stored in host memory 230 may configure multiple processors, e.g., graphics processor 250 and primary graphics processor 240, such that the graphics processing workload, such as decoding a bitstream of compressed video frames, performed by computing system 200 is divided between graphics processor 250 and primary graphics processor 240 to produce the image data for each frame.

For example, graphics processor 250 may process a larger portion of an image than primary graphics processor 240. Device driver 205 may distribute the decoding between the multiple processing devices based on several factors, including the processing performance of each particular graphics device and the complexity of different portions of the image. In some embodiments of the present invention, the portion of each frame produced by graphics processor 250 and primary graphics processor 140 may be changed each time an I frame is received.

Device driver 205 receives a compressed video stream, such as MPEG II data, and translates the bitstream into commands and data for processing by the multiple processors to produce decoded video frames. The commands and data produced by device driver 205 are stored in push buffers 235 and 237 that are read by the multiple processors. For example push buffer 235 may be read by primary graphics processor 240 and push buffer 237 may be read by graphics processor 250.

Although computing system 200 as shown is a graphics processing system, alternate embodiments of computing system 200 may process other types of data, such as audio data, multi-media data, or the like. In those alternate embodiments, graphics processor 250 and primary graphics processor 240 would be replaced with other appropriate data processing devices. Likewise, device driver 205 would be replaced with a device driver corresponding to the data processing device.

Figure 3A:
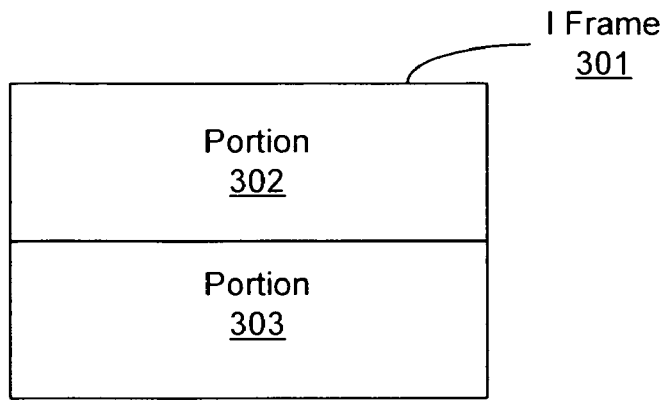
FIGS. 3A, 3B, and 3C are conceptual diagrams illustrating the splitting of decoded video frames for processing by multiple processors in accordance with one or more aspects of the present invention.

FIG. 3A is a conceptual diagram illustrating the splitting of a decoded video frame, I frame 301, for processing by multiple processors in accordance with one or more aspects of the present invention. I frame 301 is split into a portion 302 that is produced by a first processing device, e.g., primary graphics processor 240, and a portion 303 that is produced by a second processing device, e.g., graphics processor 250. As previously described, portion 302 and portion 303 may be different sizes. Each portion includes one or more slices of macroblock data, where each slice is a row of macroblocks. The height of a slice varies depending on the dimension of each macroblock. For example, when MPEG-AVC compression is used a macroblock may vary in height from 4 pixels to 16 pixels. Likewise, the height of a slice may vary from 4 pixels to 16 pixels.

Figure 3B:
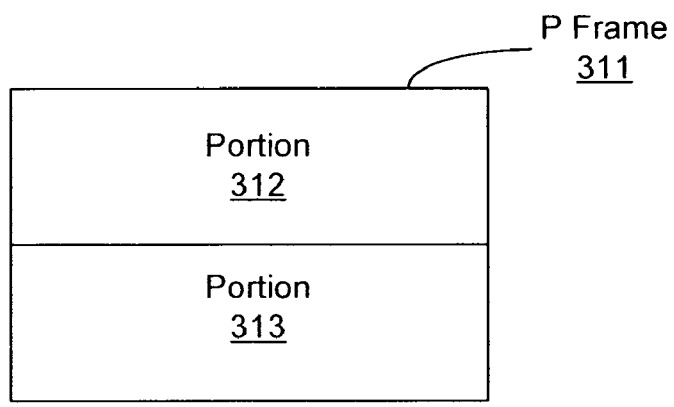

FIG. 3B is a conceptual diagram illustrating the splitting of a decoded video frame, P frame 311, for processing by multiple processors in accordance with one or more aspects of the present invention. Likewise I frame 301, P frame 311 is split into a portion 312 that is produced by a first processing device, e.g., primary graphics processor 240, and a portion 313 that is produced by a second processing device, e.g., graphics processor 250.

Figure 3C:
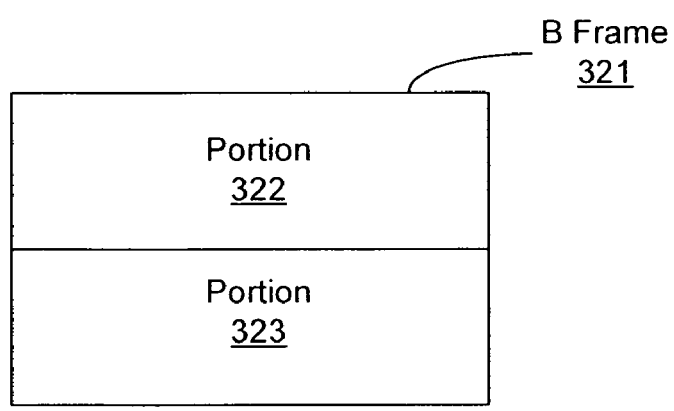

FIG. 3C is a conceptual diagram illustrating the splitting of a decoded video frame, B frame 321, for processing by multiple processors in accordance with one or more aspects of the present invention. B frame 321 is split into a portion 322 that is produced by a first processing device, e.g., primary graphics processor 240, and a portion 323 that is produced by a second processing device, e.g., graphics processor 250. In some embodiments of the present invention, additional processors are used and each frame is split into additional portions for processing. Splitting the processing of each frame improves the video frame decoding performance and may further reduce the likelihood that frames will be dropped.

FIGS. 3D and 3E are conceptual diagrams of portions of decoded video frames stored in multiple frame buffers, primary frame buffer 245 and frame buffer 255, in accordance with one or more aspects of the present invention. Portions 302, 312, and 322 are decoded by primary graphics processor 240 and stored in primary frame buffer 245. Memory is allocated in primary frame buffer 245 to store the entire I frame 301, P frame 311, and B frame 321. Portions 303, 313, and 323 are decoded by graphics processor 250 and stored in frame buffer 255. Memory is allocated in frame buffer 255 to store the entire I frame 301, P frame 311, and B frame 321. The memory mapping used for each decoded frame stored in primary frame buffer 245 and frame buffer 255 may be the same, so that address translation is unnecessary.

An advantage of using the same memory layout for the video frames in each frame buffer is that each processor writes only to the portion of a frame in any of the frame buffers that the processor is assigned to decode. Therefore, there are no memory conflicts since only one processor may write to a particular location. In some embodiments of the present invention an offset (base address) may be used for primary frame buffer 245 and/or frame buffer 255, so that some address translation is necessary between the frame buffers even though the relative memory layout is the same.

Figure 4A:
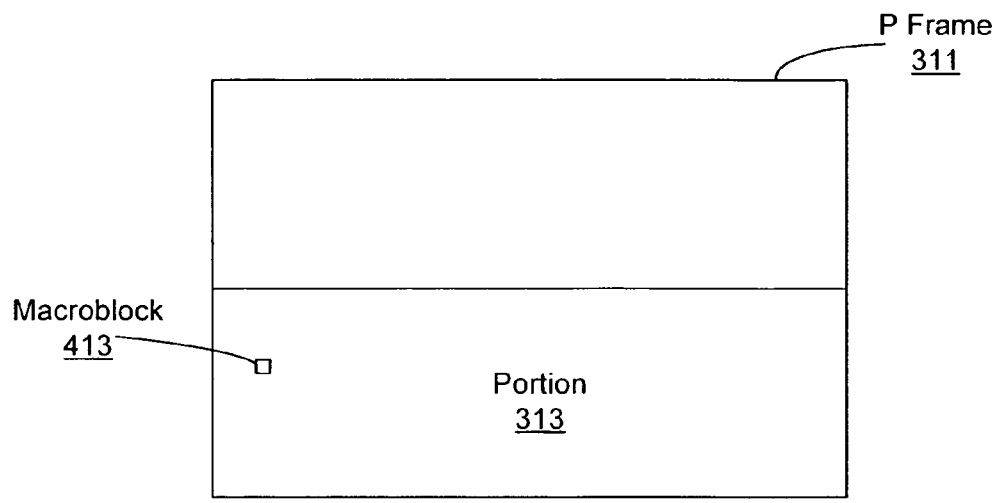
FIG. 4A illustrates a portion of a decoded video frame that includes a macroblock that is produced by applying a motion vector to a macroblock in a reference frame in accordance with one or more aspects of the present invention.

FIG. 4A illustrates a portion 313 of a decoded video frame, P frame 311 that includes a macroblock 413 that is produced by applying a motion vector to a macroblock in a reference frame in accordance with one or more aspects of the present invention. Dependent macroblock, macroblock 413, is produced by applying a motion vector to a reference macroblock in I frame 301.

Graphics processor 250 is configured to produce portion 313, including macroblock 413. Graphics processor 250 is also configured to produce portion 303 of I frame 301. When the reference macroblock used to produce macroblock 413 is in portion 303 of I frame 301, frame buffer 255 contains all of the data necessary to produce portion 313. When the reference macroblock used to produce macroblock 413 is not in portion 303 of I frame 301, the reference macroblock should be copied from another frame buffer, e.g., primary frame buffer 245, to frame buffer 255, for graphics processor 250 to decode portion 313 of dependent P frame 311.

Figure 4B:
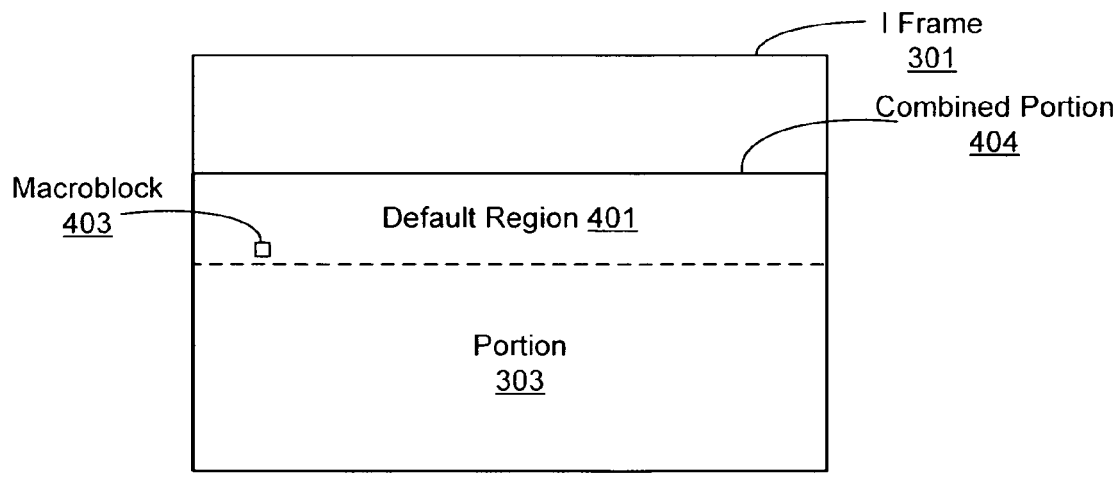
FIGS. 4B, 4C, and 4D are conceptual diagrams illustrating various positions of the macroblock in a reference frame in accordance with one or more aspects of the present invention.

FIG. 4B is a conceptual diagram illustrating a position of a reference macroblock, macroblock 403, in a reference frame in accordance with one or more aspects of the present invention. A motion vector is applied by graphics processor 250 to reference macroblock 403 to produce dependent macroblock 413. Prior to applying the motion vector, reference macroblock 403 should be copied from primary frame buffer 245 to frame buffer 255. In one embodiment of the present invention, a region of a default size, such as default region 401, may be copied from a first frame buffer, e.g., primary frame buffer 245, to a second frame buffer, frame buffer 255. When default region 401 is combined with portion 303, a larger portion of I frame 301, combined portion 404, is stored in frame buffer 255. Combined portion 404 may be larger than is necessary to produce portion 313 of P frame 311. However, because default region 401 is a fixed size, the copy operation may be inserted into push buffer 237 without analyzing the bitstream to determine which macroblocks of I frame 301 that are outside of portion 303 are needed to produce portion 313 of P frame 311. In some embodiments of the present invention, the size of default region 401 is programmable and in other embodiments of the present invention, the size of default region 401 is fixed.

Figure 4C:
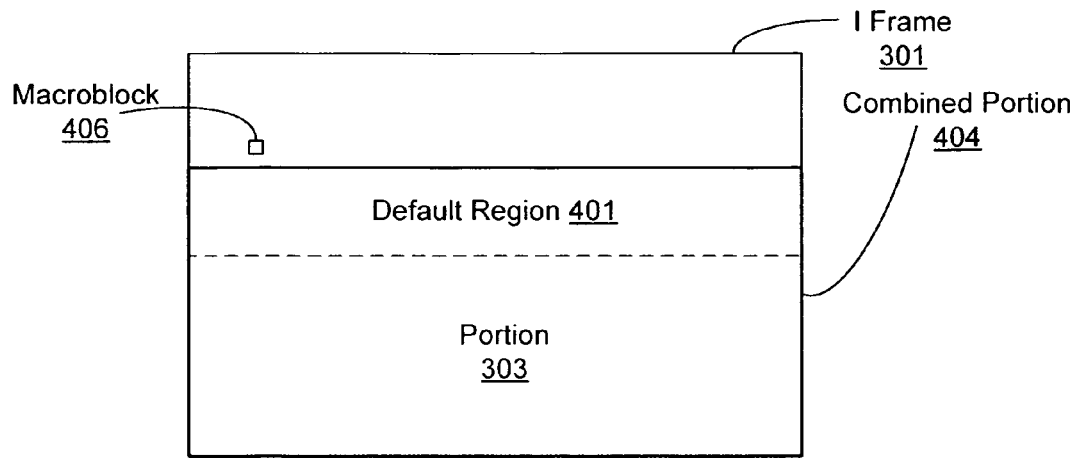

FIG. 4C is another conceptual diagram illustrating a position of a reference macroblock, macroblock 406, in a reference frame in accordance with one or more aspects of the present invention. A motion vector is applied by graphics processor 250 to reference macroblock 406 to produce dependent macroblock 413 of FIG. 4A. Prior to applying the motion vector, reference macroblock 406 should be copied from primary frame buffer 245 to frame buffer 255. Unlike macroblock 403, macroblock 406 does not lie within combined portion 404. Therefore, copying default region 401 is not adequate to provide graphics processor 250 with macroblock 406 in order to produce macroblock 413 of P frame 311.

When the default region does not include all of the macroblocks of the reference frame that are needed to produce the dependent frame, an additional region of the reference frame that is a variable size may be determined based on a maximum motion vector offset to produce the dependent frame or to produce the portion of the dependent frame. The size of the additional region is adaptive since it is based on the motion vector that will be applied to the reference frame to produce one or more dependent frames, and is therefore referred to as an adaptive region. Like the default region, the adaptive region may be copied from the first frame buffer, e.g., primary frame buffer 245, to the second frame buffer, frame buffer 255.

Figure 4D:
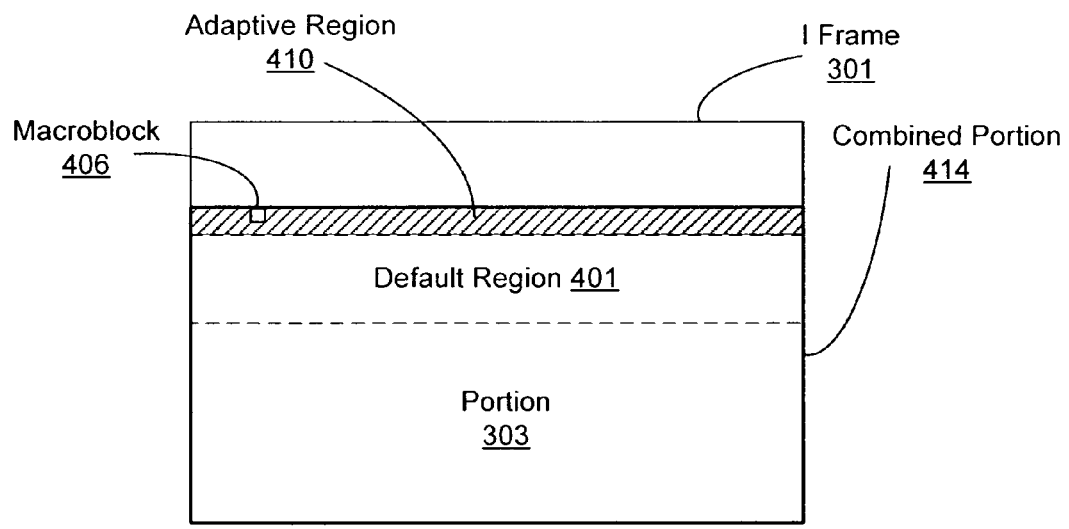

FIG. 4D is another conceptual diagram illustrating a position of macroblock 406 in I frame 301 in accordance with one or more aspects of the present invention. An adaptive region, adaptive region 410 is determined based on the maximum motion vector offset. The maximum motion vector offset is not necessarily the maximum motion vector used to produce portion 313. The maximum motion vector offset is based on the vertical distance between macroblock 406 and the boundary between adaptive region 410 and default region 401. Adaptive region 410 is sized to include macroblock 406. When adaptive region 410 and default region are combined with portion 303, a larger portion of I frame 301, combined portion 414, is stored in frame buffer 255. Because adaptive region 410 is sized based on an analysis of the motion vectors used to produce portion 313, combined portion 414 is no larger than is necessary to produce portion 313 of P frame 311.

B frames, such as B frame 321 are produced by bi-linearly interpolating between an I frame and a P frame or between two P frames without the use of motion vectors. Since B frames are not used as reference frames to decode other frames, copies of default regions and/or adaptive regions are not needed for B frames. However, in embodiments of the present invention that permit using P frames as reference frames to produce other P frames, copies of default regions and/or adaptive regions may be used for P frames. Reference macroblocks that are copied to a frame buffer are not output by the graphics processor associated with that frame buffer since those reference macroblocks are only used to decode the dependent frames. Each processor outputs only the portion of a frame that it produced by decoding.

Distributing the decoding workload between two or more processor improves the decoding throughput of a bitstream. Storing the decoded macroblocks within default and adaptive regions in the frame buffer that is directly coupled to the processor that requires those macroblocks to produce a dependent macroblock minimizes performance reductions resulting from limited access to a shared memory, such as a shared frame buffer. In a conventional processing system, the image data for each frame is stored in a single frame buffer. In contrast, as previously described in accordance with the present invention, the image data for each frame is stored in N different frame buffers, however, the image data appears to be stored in a unified frame buffer to an application program.

Figure 5A:
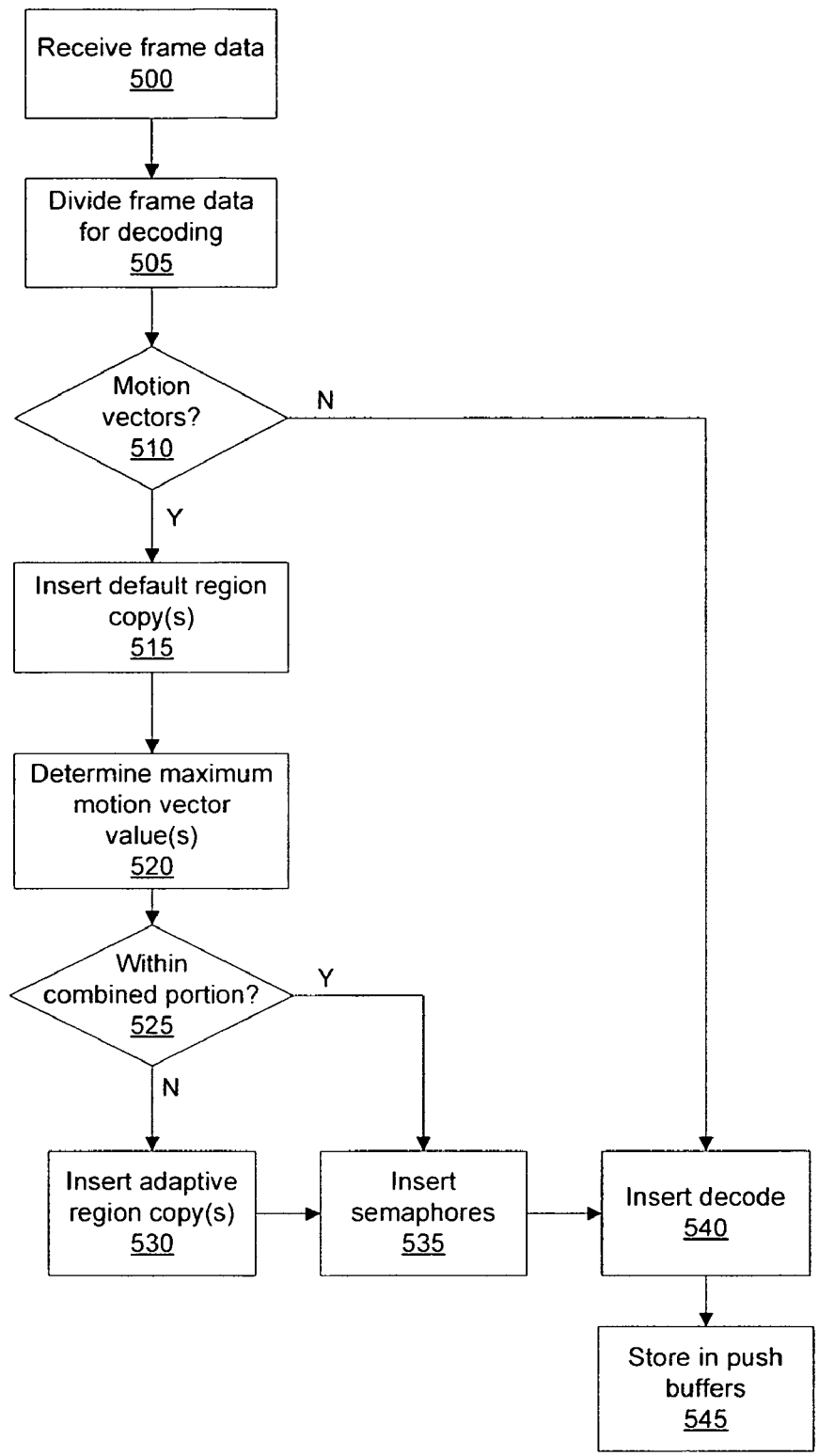
FIG. 5A is an exemplary embodiment of a method of determining a sequence of instructions for each of the multiple processors to decode a portion of a video frame in accordance with one or more aspects of the present invention.

FIG. 5A is an exemplary embodiment of a method of determining a sequence of instructions for each of the multiple processors to decode a portion of a video frame in accordance with one or more aspects of the present invention. Device driver 205 determines the sequence of instructions for graphics processor 250 and places those instructions in push buffer 237 execution by graphics processor 250. Likewise, device driver 205 determines the sequence of instructions for primary graphics processor 240 and places those instructions in push buffer 235 for execution by primary graphics processor 240.

In step 500 device driver 205 receives a bitstream including encoded video frame data. In step 510 device driver 205 parses the bitstream and divides the encoded frame data for decoding by one of the multiple processors. In step 510 device driver 205 determines if motion vectors are included in the frame data for each of the multiple processors, i.e., if the frame data is for a dependent frame. If, in step 510 device driver 205 determines that motion vectors are not included, then device driver 205 proceeds directly to step 540.

If, in step 515 device driver 205 determines that motion vectors are included, then in step 515 device driver 205 inserts one or more default region copy instructions into each instruction sequence. When a dependent frame requires data from more than one reference frame, a default region copy instruction is inserted for each reference frame. In some embodiments of the present invention, the copy instruction is a blit. An advantage of having a processor copy the reference blocks to another processor is that each processor may perform the copy without waiting for the other processor to become idle. Because the memory layout is the same for each processor's frame buffer there are no conflicts for memory locations storing decoded frame data. Therefore, processors may copy data to each other's frame buffers without checking for memory location conflicts. An alternative to copying is to have the processor that needs the reference blocks read them from the other processor's frame buffer. This alternative requires more interaction between the processors, possibly decreasing performance, since a read request is issued and then the reference blocks are returned at a later time.

In step 520 device driver 205 determines the maximum motion vector offsets for each reference macroblock that is needed to produce each portion of the dependent frame. In step 525 device driver 205 determines if all of the maximum motion vector offsets indicate that the reference macroblocks lie within combined portion, i.e., the combination of the portion of the reference frame decoded by the processor that needs the reference macroblock and the default region of the reference frame that will be copied to the processor's frame buffer. If, in step 525 device driver 205 determines that all of the reference macroblocks are available in the frame buffers associated with each processor in order to decode the portions of the dependent frame, and device driver 205 proceeds to step 535.

If, in step 525 device driver 205 determines that all of the reference macroblocks are not available in the frame buffers associated with each processor in order to decode the portions of the dependent frame, then in step 530 device driver 205 inserts an adaptive region copy instruction for each maximum motion vector offset that indicates that one or more reference macroblocks lie outside the combination of the portion of the reference frame decoded by the processor that needs the reference macroblock and the default region of the reference frame. Each adaptive region copy instruction includes all of the macroblocks needed from a particular reference frame to decode a portion of a dependent frame. When the portion of the dependent frame requires macroblocks from multiple reference frames, an adaptive region copy instruction may be inserted into the push buffer for one or more of the multiple reference frames. In step 535 device driver 205 inserts a release semaphore and an acquire semaphore in each instruction sequence, as described in conjunction with FIG. 5B.

In step 540 device driver 205 inserts a decode instruction in each instruction sequence. When executed, the decode instruction causes a processor to decode the portion of the dependent frame assigned to the processor by device driver 205. In step 545 device driver 205 stores the commands and data in a push buffer, such as push buffer 235 or 237. In some embodiments of the present invention, the size of the default region may be the entire portion of the reference frame that is decoded and stored in another frame buffer. In those embodiments, adaptive regions would not be copied between frame buffers.

Figure 5B:
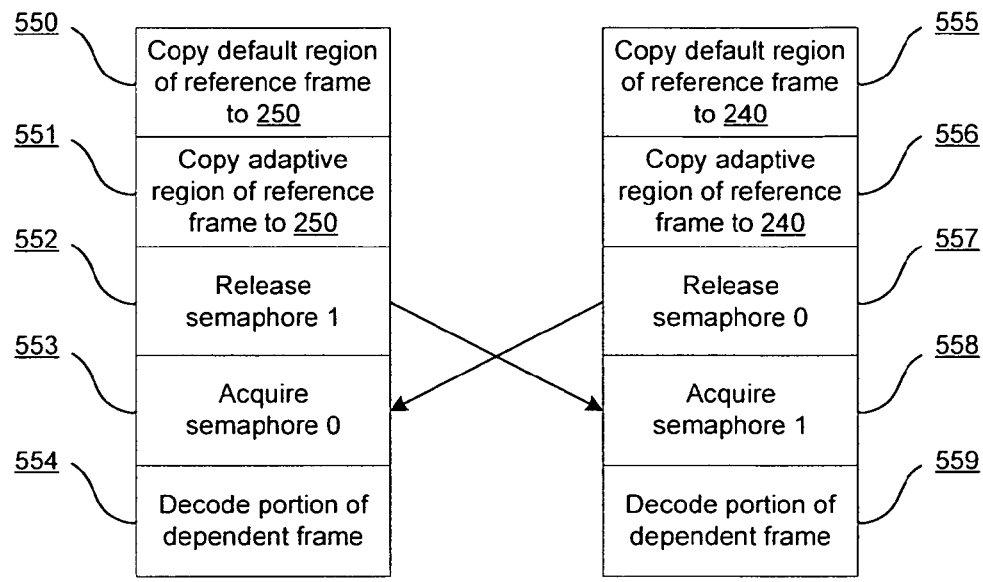
FIG. 5B is exemplary sequences of instructions produced by the method shown in FIG. 5A in accordance with one or more aspects of the present invention.

FIG. 5B illustrates exemplary sequences of instructions produced by the method shown in FIG. 5A in accordance with one or more aspects of the present invention. Each sequence shown in FIG. 5B corresponds to a particular processor. Instruction 550 is inserted during step 515 to execute a default region copy of a reference frame stored in primary frame buffer 245 to graphics processor 250 for storage in frame buffer 255. Likewise, instruction 555 is inserted during step 515 to execute a default region copy of a reference frame stored in frame buffer 255 to primary graphics processor 240 for storage in primary frame buffer 245. Instruction 551 is inserted during step 530 to execute an adaptive region copy of a reference frame stored in primary frame buffer 245 to graphics processor 250 for storage in frame buffer 255. Likewise, instruction 556 is inserted during step 530 to execute a default region copy of a reference frame stored in frame buffer 255 to primary graphics processor 240 for storage in primary frame buffer 245. Note that it may not be necessary to insert an adaptive region copy into each sequence since the adaptive region copy is specific to each portion of a dependent frame.

Instructions 552 and 553 and instructions 557 and 558 are inserted during step 535 to ensure that any default region copies and adaptive region copies are complete prior to beginning decoding of the dependent frame. Specifically, instruction 552 causes primary graphics processor 240 to release semaphore 1, indicating that the copies of reference macroblocks from primary frame buffer 245 to frame buffer 255 are complete. Graphics processor 250 acquires semaphore 1, per instruction 558, prior to decoding its portion of the dependent frame. Similarly, instruction 557 causes graphics processor 250 to release semaphore 0, indicating that the copies of reference macroblocks from frame buffer 255 to primary frame buffer 245 are complete. Primary graphics processor 240 acquires semaphore 4, per instruction 558, prior to decoding its portion of the dependent frame.

Figure 5C:
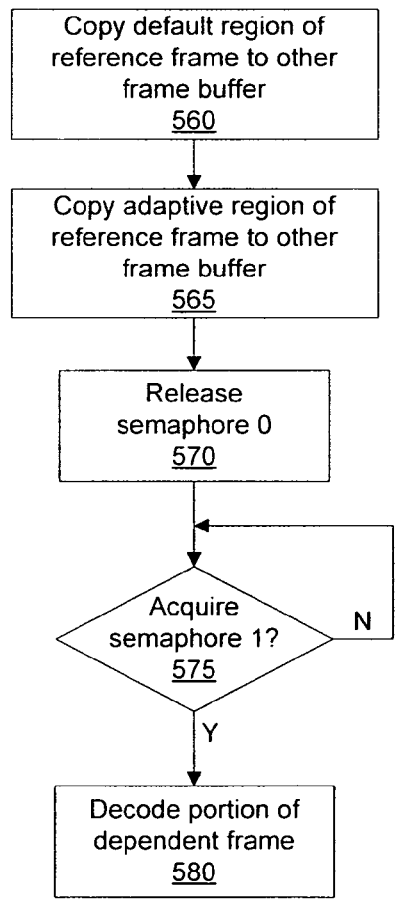
FIG. 5C is an exemplary embodiment of a method of executing a sequence of instructions shown in FIG. 5B in accordance with one or more aspects of the present invention.

FIG. 5C is an exemplary embodiment of a method of executing a sequence of instructions shown in FIG. 5B in accordance with one or more aspects of the present invention. In step 560 primary graphics processor 240 copies a default region of a reference frame to frame buffer 255 associated with graphics processor 250. In step 565 primary graphics processor 565 copies an adaptive region of the reference frame to frame buffer 255. In step 570 primary graphics processor 240 releases semaphore 0, indicating that the default and adaptive region copies to frame buffer 255 are complete. In step 575 primary graphics processor 240 determines if semaphore 1 can be acquired, and, if not, primary graphics processor 240 repeats step 575. When semaphore 1 is acquired by primary graphics processor 240, primary graphics processor 240 proceeds to step 580 and decodes the dependent frame. Primary graphics processor 240 will release a semaphore for each destination frame buffer that reference macroblocks are copied to from primary frame buffer 245. Primary graphics processor 240 will acquire a semaphore for each source frame buffer that reference macroblocks are copied from to primary frame buffer 245.

Figure 6A:
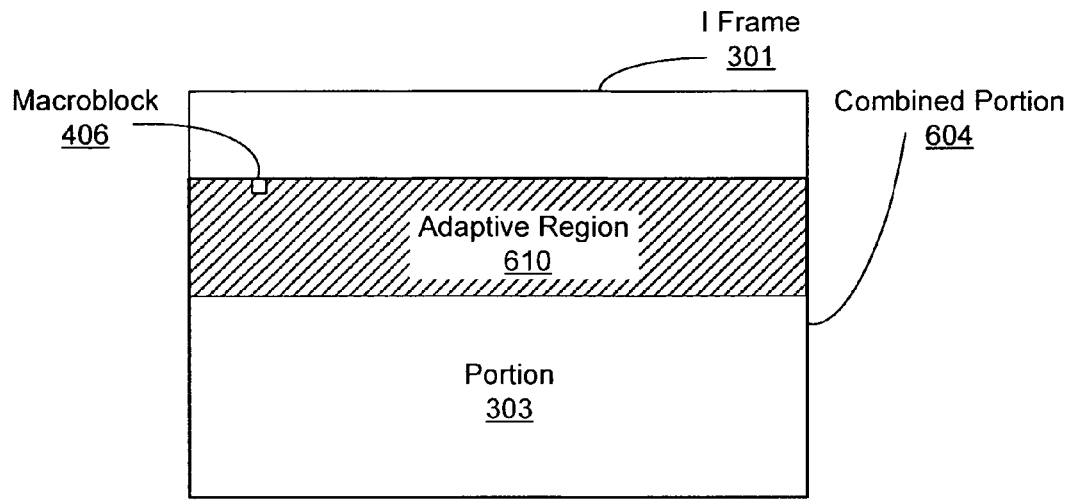
FIGS. 6A and 6B are conceptual diagrams illustrating various positions of the macroblock in a reference frame in accordance with one or more aspects of the present invention.

FIG. 6A is a conceptual diagram illustrating macroblock 406 in reference frame, I frame 301, in accordance with one or more aspects of the present invention. In some embodiments of the present invention, the default regions are not used to copy portions of reference frames to frame buffers for decoding portions of dependent frames. Instead, only the adaptive regions are used. When a motion vector will be applied to macroblock 406 to produce macroblock 413 within portion 313 of P frame 311 (see FIG. 4A), macroblock 406 is included within adaptive region 610. Adaptive region 610 is copied from primary frame buffer 245 to frame buffer 255 in order to decode portion 313 of dependent frame, P frame 311. The maximum motion vector offset of I frame 301 needed to produce portion 313 of P frame 311 results from the motion vector applied to macroblock 406 to produce macroblock 413. Therefore, adaptive region 610 is sized to include macroblock 406 and the combination of adaptive region 610 and portion 303 (stored in frame buffer 255) is combined portion 604.

Figure 6B:
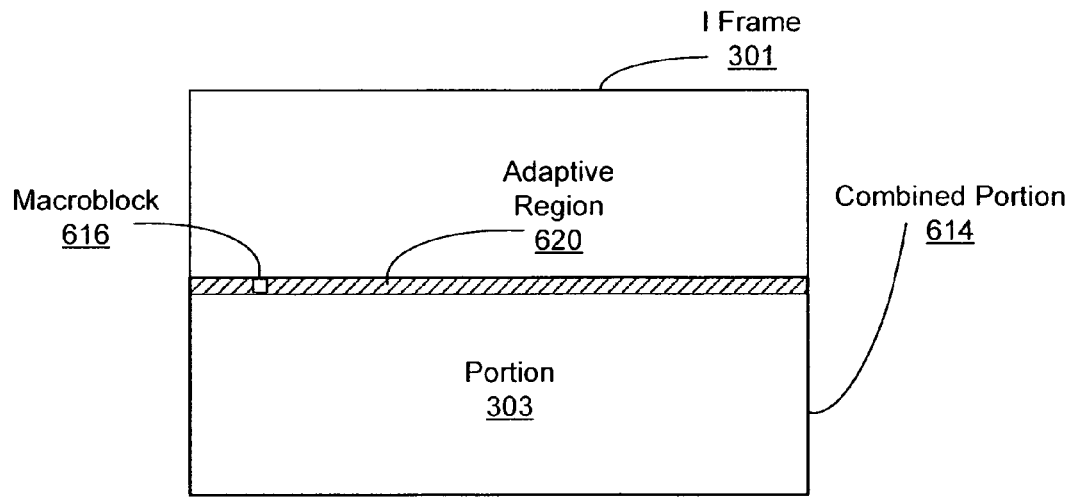

FIG. 6B is a conceptual diagram illustrating macroblock 616 in reference frame, I frame 301, in accordance with one or more aspects of the present invention. When a motion vector will be applied to macroblock 416 to produce macroblock 413 within portion 313 of P frame 311 (see FIG. 4A), macroblock 416 is included within adaptive region 620. Adaptive region 620 is copied from primary frame buffer 245 to frame buffer 255 in order to decode portion 313 of dependent frame, P frame 311. The maximum motion vector offset of I frame 301 needed to produce portion 313 of P frame 311 results from the motion vector applied to macroblock 416 to produce macroblock 413. Therefore, adaptive region 620 is sized to include macroblock 416 and the combination of adaptive region 620 and portion 303 (stored in frame buffer 255) is combined portion 614.

Figure 7:
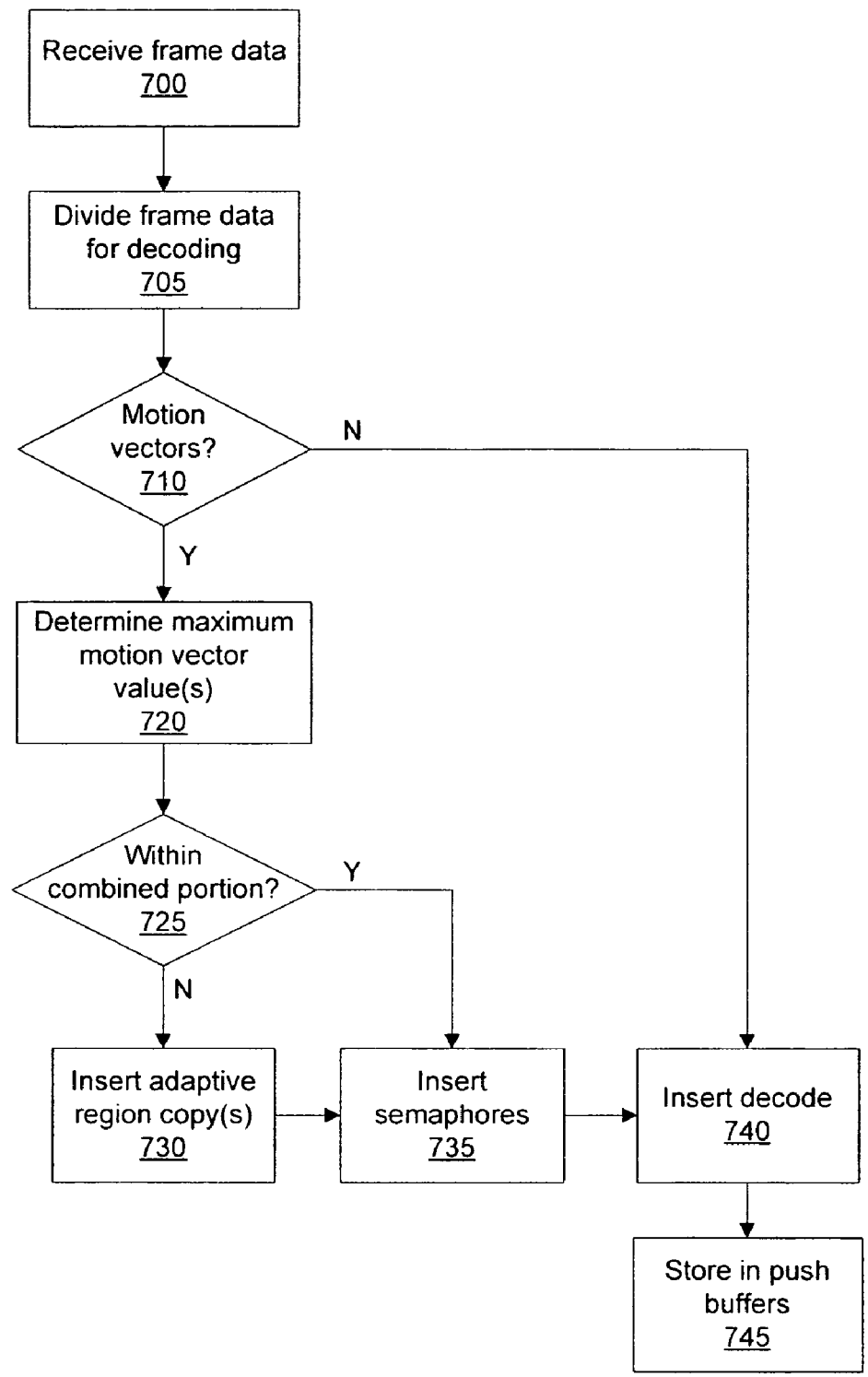
FIG. 7 is another exemplary embodiment of a method of determining a sequence of instructions for each of the multiple processors to decode a portion of a video frame in accordance with one or more aspects of the present invention.

FIG. 7 is another exemplary embodiment of a method of determining a sequence of instructions for each of the multiple processors to decode a portion of a video frame in accordance with one or more aspects of the present invention. Steps 700, 705, 710, 720, 725, 730, 735, 740, and 745 corresponds to previously described steps 500, 505, 510, 520, 525, 530, 535, 540, and 545 of FIG. 5A, respectively. In this embodiment of a method for determining a sequence of instructions, default region copies are not inserted in the sequence. Instead, only adaptive region copies are used to provide each of the multiple processors with the reference data needed to produce the portions of each dependent frame. Persons skilled in the art will appreciate that any system configured to perform the method steps of FIGS. 5A, 5C, and 7 or their equivalents, is within the scope of the present invention.

Note that when the maximum motion vector offset defines an adaptive region that is smaller that a default region such as default region 401, less data is copied than when a default region is used. Therefore, bandwidth between graphics processor and primary graphics processor may be reduced by using adaptive regions without default regions. Copying data between frame buffers does not burden the host processor and therefore copying default regions or adaptive regions may not adversely impact overall system performance. However, copying data unnecessarily may reduce the decoding performance if the decoding performance is limited by frame buffer bandwidth. However, determining the size of each adaptive region requires analyzing the motion vectors for each dependent frame and the analysis is performed using the host processor. Depending on the resource that limits decoding performance (host processor 210 computations or frame buffer bandwidth), an embodiment of the present invention may be employed that uses only default regions, only adaptive regions, or a combination of default and adaptive regions.

While the foregoing is directed to embodiments of the present invention, other and further embodiments of the invention may be devised without departing from the basic scope thereof, and the scope thereof is determined by the claims that follow. Specifically, persons skilled in the art will recognize that the methods and systems described may be used for processing data other than graphics data where the data is used by processors in a multi-processing data processing system. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of decoding compressed video data using multiple processing devices, comprising:
   receiving a bitstream that includes the compressed video data;
   identifying a first portion of the compressed video data to be decoded by a first processing device to produce a first portion of a reference frame;
   identifying a second portion of the compressed video data be decoded by a second processing device to produce a second portion of the reference frame; and
   determining if a region of the second portion of the reference frame is needed by the first processing device to produce a first portion of a dependent frame.

2. The method of claim 1, further comprising copying the region to a memory accessible by the first processing device when the region is needed by the first processing device to produce the first portion of the dependent frame.

3. The method of claim 2, further comprising acquiring a semaphore to ensure that the copying is completed before using the region to produce the first portion of the dependent frame.

4. The method of claim 1, further comprising copying a default sized region of the second portion of the reference frame from a memory accessible by the second processing device to a memory accessible by the first processing device.

5. The method of claim 4, further comprising copying an adaptive region of the second portion of the reference frame when the region of the second portion of the reference frame that is needed by the first processing device to produce the first portion of the dependent frame is larger than the default sized region.

6. The method of claim 4, wherein a size of the default sized region is programmable.

7. The method of claim 1, wherein the step of determining includes analyzing motion vectors for application to the reference frame to determine a size of the region of the first portion of the dependent frame.

8. A non-transitory computer-readable medium containing a program which, when executed by a programmable graphics processor, performs a process for decoding compressed video data using multiple processing devices, the process comprising:
   receiving a bitstream that includes the compressed video data;
   identifying a first portion of the compressed video data to be decoded by a first processing device to produce a first portion of a reference frame;
   identifying a second portion of the compressed video data to be decoded by a second processing device to produce a second portion of the reference frame; and
   determining if a region of the second portion of the reference frame is needed by the first processing device to produce a first portion of a dependent frame.

9. The computer-readable medium of claim 8, wherein the step of determining includes analyzing motion vectors for application to the reference frame to determine a size of the region of the first portion of the dependent frame.

10. The computer-readable medium of claim 8, further comprising inserting a region copy instruction into a sequence of instructions for execution by the second processing device.

11. A multiple processor system for decoding compressed video data represented by a bitstream including motion vectors, comprising:
   a first processing device that is coupled to a first frame buffer and configured to decode a first portion of the bitstream to produce a first portion of a dependent video frame, wherein the first frame buffer is configured to store the first portion of the dependent video frame and a first portion of a reference video frame; and
   a second processing device that is coupled to a second frame buffer and configured to decode a second portion of the bitstream to produce a second portion of a dependent video frame, wherein the second frame buffer is configured to store the second portion of the dependent video frame and a second portion of the reference video frame.

12. The system of claim 11, wherein the first processing device is configured to copy a region of the first portion of the reference frame from the first frame buffer to the second frame buffer.

13. The system of claim 12, wherein the first processing device is configured to release a semaphore after copying the region of the first portion of the reference frame from the first frame buffer to the second frame buffer.

14. The system of claim 12, wherein the second processing device is configured to acquire a semaphore before using the region of the first portion of the reference frame copied from the first frame buffer to produce the second portion of the dependent video frame.

15. The system of claim 12, wherein a size of the region is programmable.

16. The system of claim 12, wherein a size of the region is computed based on a maximum motion vector applied to the reference frame to produce the second portion of the dependent video frame.

17. The system of claim 12, wherein the region is a default region that is smaller than a portion of the reference frame that is needed by the first processing device to produce the second portion of the dependent frame and the first processing device is further configured to copy an adaptive region of the first portion of the reference frame to provide the portion of the reference frame that is needed by the first processing device to produce the second portion of the dependent frame.

18. The system of claim 11, further comprising a device driver configured to construct a first sequence of instructions to configure the first processor to produce the first portion of the dependent video frame and to construct a second sequence of instructions to configure the second processor to produce the second portion of the dependent video frame.

19. The system of claim 18, wherein the device driver identifies a first portion of the bitstream to be decoded by the first processing device, a second portion of the bitstream to be decoded by the second processing device, and a region of a reference frame decoded by the first processing device that is needed by the second processing device to produce the second portion of the dependent video frame.

20. The system of claim 11, wherein the first frame buffer and the second frame buffer use a single memory layout for the reference video frame and the dependent video frame.

* * * * *